(12) United States Patent
Tsukioka

(10) Patent No.: US 7,454,057 B2
(45) Date of Patent: Nov. 18, 2008

(54) IMAGE PROCESSING APPARATUS AND IMAGE PROCESSING PROGRAM

(75) Inventor: Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 426 days.

(21) Appl. No.: 11/226,944

(22) Filed: Sep. 15, 2005

(65) Prior Publication Data
US 2006/0012841 A1 Jan. 19, 2006

Related U.S. Application Data

(63) Continuation of application No. PCT/JP2004/004258, filed on Mar. 26, 2004.

(30) Foreign Application Priority Data

| Mar. 28, 2003 | (JP) | ............................. 2003-092071 |
| Dec. 15, 2003 | (JP) | ............................. 2003-416796 |

(51) Int. Cl.
*G06K 9/00* (2006.01)
*G06K 9/38* (2006.01)
*G06K 9/68* (2006.01)

(52) U.S. Cl. ...................................... 382/167; 382/272
(58) Field of Classification Search ................ 382/162, 382/164, 167, 218, 219, 254, 260–264, 272; 345/589, 600–604; 358/515, 518
See application file for complete search history.

(56) References Cited

U.S. PATENT DOCUMENTS 6,876,763 B2* 4/2005 Sorek et al. ................. 382/162

6,931,152 B2* 8/2005 Spitzer ....................... 382/167

(Continued)

FOREIGN PATENT DOCUMENTS

JP          8-298669 A       11/1996

(Continued)

OTHER PUBLICATIONS

PCT translation of the Written Opinion of the International Searching Authority for International Appln No. PCT/JP2004/004258, 4 sheets.

*Primary Examiner*—Amir Alavi
(74) *Attorney, Agent, or Firm*—Frishauf, Holtz, Goodman & Chick, P.C.

(57) ABSTRACT

An image processing apparatus inputs an image obtained by sensing an optical image by an image sensing system, compensates an omitted color component, and outputs a color image. A weight setting unit sets a weight Wk in each direction Sk (k is an integer from 1 to n) of a plurality of directions S1, S2, ..., Sn (n is an integer of not less than 1) starting from a pixel of interest in a predetermined neighborhood of the pixel of interest. An average value calculation unit calculates a weighted average of pixel values Vk of pixels having a specific color component and located on each direction Sk (k is an integer from 1 to n) in the predetermined neighborhood by using weights W1 to Wn of the pixel values V1 to Vn. An restoration unit causes the average calculation unit to calculate weighted averages of a plurality of types of color components and restores a value of an omitted color component of the pixel of interest on the basis of the weighted average result and the pixel value of the pixel of interest.

25 Claims, 10 Drawing Sheets

U.S. PATENT DOCUMENTS

| | | | |
|---|---|---|---|
| 7,085,426 B2 * | 8/2006 | August | 382/260 |
| 7,136,187 B1 * | 11/2006 | Ohkubo | 358/1.9 |
| 7,356,180 B2 * | 4/2008 | Speigle et al. | 382/167 |
| 7,369,699 B1 * | 5/2008 | Christie | 382/163 |
| 7,379,583 B2 * | 5/2008 | Zitnick et al. | 382/154 |
| 7,379,612 B2 * | 5/2008 | Milanfar et al. | 382/254 |
| 2001/0016064 A1 * | 8/2001 | Tsuruoka et al. | 382/167 |
| 2004/0189818 A1 * | 9/2004 | Tsuruoka et al. | 348/221.1 |
| 2006/0012841 A1 * | 1/2006 | Tsukioka | 358/518 |
| 2006/0250670 A1 * | 11/2006 | Tsukioka | 358/518 |

FOREIGN PATENT DOCUMENTS

| | | |
|---|---|---|
| JP | 10-164602 A | 6/1998 |
| JP | 2001-45509 A | 2/2001 |
| JP | 2001-197512 A | 7/2001 |
| JP | 2002-152762 A | 5/2002 |

\* cited by examiner

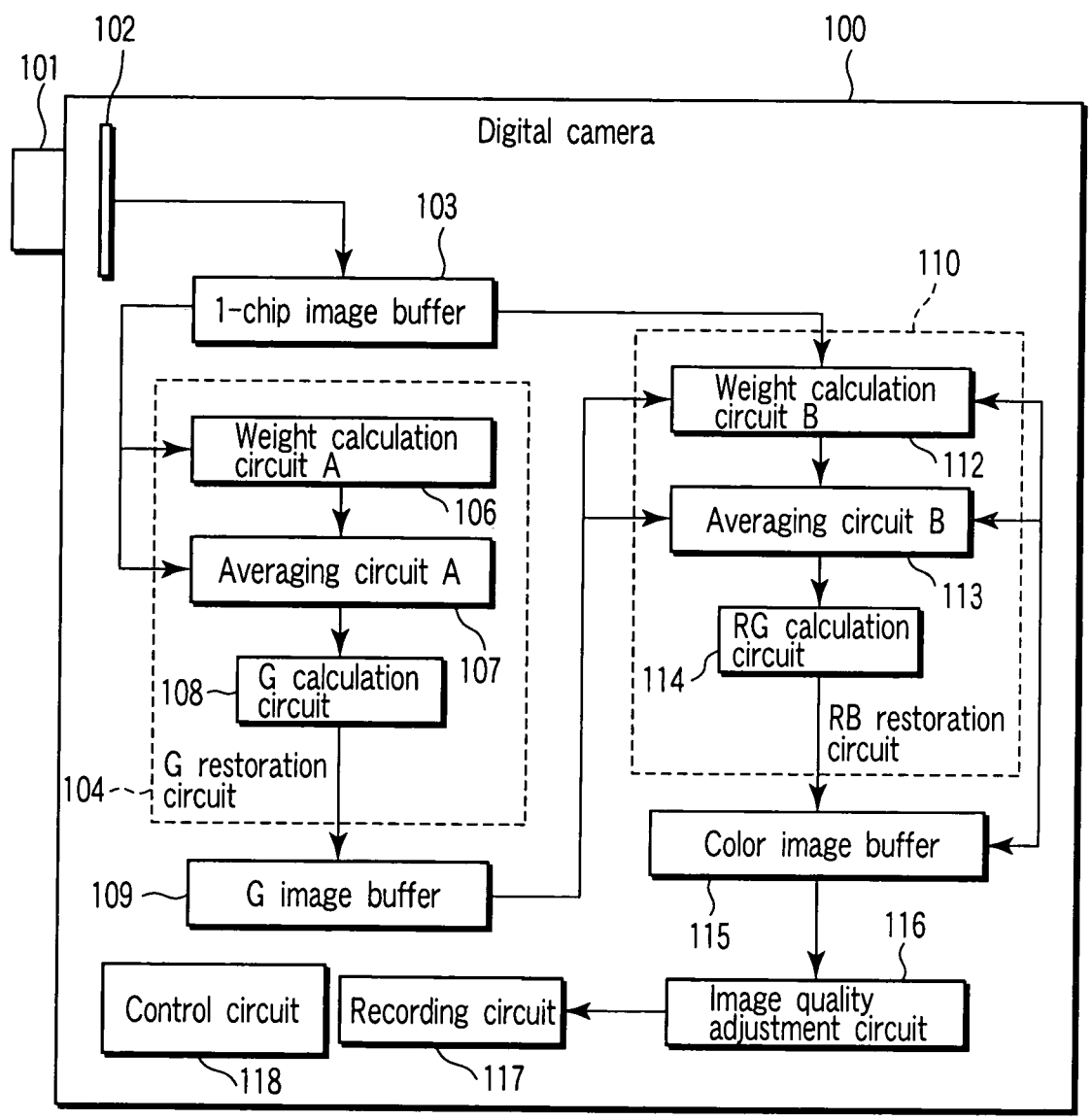
F I G. 1

S1, S2, S3, S4, S5, S6, S7, S8

IMAGE PROCESSING APPARATUS AND IMAGE PROCESSING PROGRAM

CROSS REFERENCE TO RELATED APPLICATIONS

This is a Continuation Application of PCT Application No. PCT/JP2004/004258, filed Mar. 26, 2004, which was published under PCT Article 21(2) in Japanese.

This application is based upon and claims the benefit of priority from prior Japanese Patent Applications No. 2003-092071, filed Mar. 28, 2003; and No. 2003-416796, filed Dec. 15, 2003, the entire contents of both of which are incorporated herein by reference.

BACKGROUND OF THE INVENTION

1. Field of the Invention

The present invention relates to an image processing apparatus and image processing program and, more particularly, to an image processing apparatus and image processing program which cause a computer to process an image output from a 1-chip imaging system, 2-chip imaging system, or 3-chip pixel-shift imaging system and generate a color digital image having three color component values for each pixel.

2. Description of the Related Art

A 1-chip imaging sensing system used in a digital camera or the like uses a 1-chip imaging element mounted with color filters different for the respective pixels. An output image from a 1-chip imaging sensing element allows to derive only one type of color component value for each pixel. As a result, to generate a color digital image, color processing for compensating for color component values omitted in the respective pixels must be performed. This problem also arises in use of the 2-chip imaging system or 3-chip pixel-shift imaging system.

In this color processing, degradations such as blur or false colors occur in a final color image if simple techniches such as low pass filtering are used. For this reason, a variety of methods have been conventionally proposed. For example, in Jpn. Pat. Appln. KOKAI Publication No. 8-298669 which discloses a technique about edge detection, neighboring pixels are set in a cross-shaped manner around a pixel of interest, as shown in FIG. 15A, in an image sensing element of a 1CCD Bayer array having a color filter layout shown in FIG. 15A. Horizontal and vertical interpolation values Gh and Gv with respect to the pixel of interest are estimated by $$Gh=(G4+G6)/2+(2*B5-B3-B7)/4$$

$$Gv=(G2+G8)/2+(2*B5-B1-B9)/4 \quad (1\text{-}1)$$

Evaluation values dH and dV representing a degree of changes in the horizontal or vertical direction are calculated by $$dH=|G4-G6|+|B3-2*B5+B7|$$

$$dV=|G2-G8|+|B1-2*B5+B9| \quad (1\text{-}2)$$

An interpolation value in a direction having a smaller evaluation value and determined to be flatter is used. Note that |x| represents the absolute value of x, and * represents multiplication.

In Jpn. Pat. Appln. KIKAI Publication No. 10-164602 as another prior art, a difference |G2−G8| in the horizontal direction is calculated, and a value n is calculated as a function of the difference. Similarly, a difference |G4−G6| in the vertical direction is calculated, and a value m is calculated as a function of the difference. A final interpolation result Gx of the pixel of interest is calculated by weighting the horizontal and vertical pixel values by $$Gx=(m*(G4+G6)+n*(G2+G8))/(2*(m+n)) \quad (2\text{-}1)$$

This equation is almost equivalent to calculations of vertical interpolation values by $$Gh=(G2+G8)/2, Gv=(G4+G6)/2 \quad (2\text{-}2)$$

and the calculation of the weighted average of the vertical interpolation values by $$Gx=(n*Gh+m*Gv)/(n+m) \quad (2\text{-}3)$$

BRIEF SUMMARY OF THE INVENTION

According to a first aspect of the present invention, there is provided an image processing apparatus which inputs an image obtained by sensing an optical image by an imaging system, compensates an omitted color component, and outputs a color image, comprising:

a weight setting unit which sets a weight Wk in each direction Sk (k is an integer from 1 to n) of a plurality of directions S1, S2, ..., Sn (n is an integer of not less than 1) starting from a pixel of interest in a predetermined neighborhood of the pixel of interest;

an average value calculation unit which calculates a weighted average of pixel values Vk of pixels having a specific color component and located on each direction Sk (k is an integer from 1 to n) near the predetermined size by using weights W1 to Wn of the pixel values V1 to Vn; and a restoration unit which causes the average calculation unit to calculate weighted averages of a plurality of types of color components and restores a value of an omitted color component of the pixel of interest on the basis of the weighted average result and the pixel value of the pixel of interest.

According to a second aspect of the present invention, there is provided an image processing apparatus according to the first aspect, wherein the weight setting unit selects preferably for a predetermined color component at least one set having two pixels parallel to said each direction Sk in the predetermined neighborhood and having the predetermined color component and calculates the weight Wk for said each direction Sk on the basis of a pixel value difference of each set.

According to a third aspect of the present invention, there is provided an image processing apparatus according to the second aspect, wherein the weight setting unit preferably calculates the pixel value differences of said each set for a plurality of types of color components and determines the weight Wk for said each direction Sk on the basis of a sum of products of the pixel value differences and a predetermined coefficient.

According to a fourth aspect of the present invention, there is provided an image processing apparatus according to the first aspect, wherein the weight setting unit comprises preferably an estimation unit which estimates an approximate value of a predetermined color component of the pixel of interest in the predetermined neighborhood, and calculates the weight Wk for said each direction Sk on the basis of the pixel value of the pixel located on said each direction Sk and having the predetermined color component and a difference between the approximate values.

According to a fifth aspect of the present invention, there is provided an image processing apparatus according to the first aspect, wherein the weight setting unit selects preferably a plurality of sets each having the two pixels parallel to said each direction Sk in the predetermined neighborhood and having the predetermined color component and calculates a minimum value of the pixel value differences of each set.

According to a sixth aspect of the present invention, there is provided an image processing apparatus according to any one of the second, third, and fifth aspects, wherein the weight setting unit obtains preferably a maximum value of the pixel value differences after the pixel value difference for said each direction Sk is calculated for all integers of 1 to n and calculates weights so as to equalize weights in the respective directions when the magnitudes of the maximum values are smaller.

According to a seventh aspect of the present invention, there is provided an image processing apparatus according to any one of the third to fifth aspects, wherein the weight setting unit calculates preferably the weight Wk for said each direction so that each weight is in inverse proportion to the pixel value difference for said each direction Sk and the sum of the weights becomes 1.

According to an eighth aspect of the present invention, there is provided an image processing apparatus according to any one of the second, third, and fifth aspects, wherein the weight setting unit preferably has an evaluation unit which evaluates an edge color misregistration amount between color components in the pixel of interest and changes a weight calculation method in accordance with an evaluation result of the color misregistration evaluation unit.

According to a ninth aspect of the present invention, there is provided an image processing apparatus according to the eighth aspect, wherein the weight setting unit preferably changes the weight calculation method by changing the predetermined coefficient in accordance with an evaluation result in the color misregistration evaluation unit.

According to a tenth aspect of the present invention, there is provided an image processing apparatus according to the first aspect, wherein the restoration unit multiplies predetermined coefficients by the weighted average results for the plurality of color components and the value of the pixel of interest, and add the products to obtain a value of the omitted color component.

According to an eleventh aspect of the present invention, there is provided an image processing apparatus according to the tenth aspect, wherein the restoration unit comprises preferably a color misregistration evaluation unit which evaluates a color misregistration amount of an edge between color components in the pixel of interest and changes a calculation for the omitted color component in accordance with an evaluation result in the color misregistration evaluation unit.

According to a twelfth aspect of the present invention, there is provided an image processing apparatus according to the tenth aspect, wherein the restoration unit comprises preferably a color misregistration evaluation unit which evaluates a color misregistration amount of an edge between color components in the pixel of interest and changes the predetermined coefficient in accordance with the evaluation result of the color misregistration evaluation unit.

According to a thirteen aspect of the present invention, there is provided an image processing apparatus according to any one of the eighth, eleventh and twelfth aspects, wherein the color misregistration evaluation unit evaluates preferably an edge color misregistration amount between color components on the basis of chromatic aberration of the optical image.

According to a fourteenth aspect of the present invention, there is provided an image processing apparatus according to the third aspect, wherein the 1-chip imaging element has preferably a mosaic filter of a primary color Bayer array, a color component R or B is obtained in the pixel of interest, four directions, upper, lower, right, and left directions of the pixel of interest are defined as said plurality of directions S1 to S4, said plurality of types of color components are G and a color component obtained in the pixel of interest, and the omitted color component is G.

According to a fifteenth aspect of the present invention, there is provided an image processing apparatus according to the third aspect, wherein the 1-chip imaging element has preferably a mosaic filter of a primary color Bayer array, a color component G is obtained in the pixel of interest, said plurality of directions are defined as directions connecting pixels having a color component R in the predetermined neighborhood centered on the pixel of interest, said plurality of types of color components are R and G, and the omitted color component is R.

According to a sixteenth aspect of the present invention, there is provided an image processing apparatus according to the third aspect, wherein the 1-chip imaging element has preferably a mosaic filter of a primary color Bayer array, a color component G is obtained in the pixel of interest, said plurality of directions are defined as directions connecting pixels having a color component B in the predetermined neighborhood centered on the pixel of interest, said plurality of types of color components are B and G, and the omitted color component is B.

According to a seventeenth aspect of the present invention, there is provided an image processing apparatus according to the first aspect, wherein said plurality of directions are set preferably as directions connecting the pixel of interest and pixels each having both the omitted color component at the pixel of interest and one of the color components obtained at the pixel of interest.

According to an eighteenth aspect of the present invention, there is provided an image processing apparatus according to the seventeenth aspect, wherein the 1-chip imaging element has a preferably mosaic filter of a primary color Bayer array, the omitted color component in the pixel of interest is R or B, and one of the color components obtained in the pixel of interest is G.

According to a nineteenth aspect of the present invention, there is provided an image processing apparatus according to the ninth aspect, wherein when the predetermined coefficient is to be changed in accordance with the evaluation result of the color misregistration evaluation unit, the color misregistration evaluation unit identifies the color components whose misregistration amount are large, and the weight setting unit males the coefficient assigned to the pixel value difference associated with the color components smaller.

According to a twentieth aspect of the present invention, there is provided an image processing apparatus according to the twelfth aspect, wherein when the predetermined coefficient is to be changed in accordance with the evaluation result of the color misregistration evaluation unit, the color misregistration evaluation unit identifies the color components whose misregistration amount are large, and the restoration unit makes the coefficient assigned to the weighted average result associated with the color components smaller.

According to a twenty-first aspect of the present invention, there is provided an image processing program which causes a computer to input an image obtained by sensing an optical image by an image sensing system, compensate an omitted color component, and output a color image, comprising:

a weight setting function which sets a weight Wk in each direction Sk (k is an integer from 1 to n) of a plurality of directions S1, S2, ..., Sn (n is an integer of not less than 1) starting from a pixel of interest in a predetermined neighborhood of the pixel of interest;

an averaging function which calculates a weighted average of pixel values Vk of pixels having a specific color component and located on each direction Sk (k is an integer from 1 to n) in the predetermined neighborhood by using weights W1 to Wn of the pixel values V1 to Vn; and a restoration unit function which causes the averaging function to calculate weighted averages of a plurality of types of color components and restores a value of an omitted color component of the pixel of interest on the basis of the weighted average result and the pixel value of the pixel of interest.

According to a twenty-second aspect of the present invention, there is provided an image processing program according to the twenty-first aspect, wherein the function setting function selects, for each color component, at least one set having two pixels parallel to a direction Sk in the predetermined neighborhood and having the color component, and a weight Wk in said each direction Sk is calculated on the basis of a value adjusted by multiplying a predetermined coefficient to a pixel value difference of said each set.

According to a twenty-third aspect of the present invention, there is provided an image processing program according to the twenty-first aspect, wherein the restoration function has a color misregistration evaluation function of evaluating an edge color misregistration amount between color components in the pixel of interest, and a calculation method for the omitted color component is changed in accordance with an evaluation result of the color misregistration evaluation function.

According to a twenty-fourth aspect of the present invention, there is provided an image processing program according to the twenty-first aspect, wherein the restoration function has a color misregistration evaluation function of evaluating an edge color misregistration amount between color components in the pixel of interest, a coefficient which changes in accordance with the evaluation result of the color misregistration evaluation function is multiplied to the pixel value of the pixel of interest and the weighted average result of the averaging function for said plurality of color components, and the value of the omitted color component is obtained.

According to a twenty-fifth aspect of the present invention, there is provided an image processing program according to any one of the second, third, and, twenty-fourth aspects, wherein the color misregistration evaluation function evaluates an edge color misregistration amount between the color components on the basis of chromatic aberration of the optical image.

BRIEF DESCRIPTION OF THE SEVERAL VIEWS OF THE DRAWING

FIG. 1 is a block diagram showing a schematic arrangement of a digital camera 100 serving as an image processing apparatus according to the first embodiment of the present invention;

DETAILED DESCRIPTION OF THE INVENTION

Figure 2:
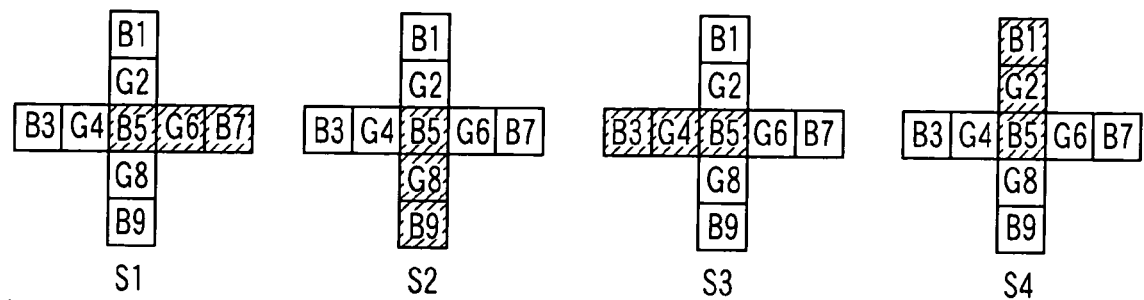
FIG. 2 is a view for explaining weight calculation areas set in a weight calculation circuit A 106.

Preferred embodiments of the present invention will now be described in detail with reference to the accompanying drawings.

First Embodiment

FIG. 1 is a block diagram showing the schematic arrangement of a digital camera 100 serving as an image processing apparatus according to the first embodiment of the present invention. As shown in FIG. 1, the digital camera 100 comprises an optical system 101, Single-chip Bayer array CCD 102, 1CCD image buffer 103, G restoration circuit 104, RB restoration circuit 110, image quality adjustment circuit 116, recording circuit 117, and control circuit 118. The 1CCD image buffer 103 stores an output image from the Single-chip Bayer array CCD 102. The G restoration circuit 104 estimates a G component at a pixel position where the G component is omitted in an image in the 1CCD image buffer 103, generates the estimated G-component image, and stores the G-component image in a G image buffer 109. The RB restoration circuit 110 restores the omitted R and B components on the basis of the G-component image stored in the G image buffer 109 and the image in the 1CCD image buffer 103, generates a tri-color image, and stores it in a color image buffer 115. The image quality adjustment circuit 116 performs color conversion and edge enhancement for the tri-color image stored in the color image buffer 115. The recording circuit 117 records a quality-adjusted image. The control circuit 118 controls the operations of the above circuits.

The G restoration circuit 104 comprises a weight calculation circuit A 106, averaging circuit A 107, and G calculation circuit 108. The RB restoration circuit 110 comprises a weight calculation circuit B 112, averaging circuit B 113, and RB calculation circuit 114. The weight calculation circuits A 106 and B 112 evaluate undulations near the pixel of interest in a plurality of directions and calculate weights assigned to the respective areas on the basis of the evaluation results. The calculation method of the weight calculation circuit A 106 is different from that of the weight calculation circuit B 112.

Each of the averaging circuits A 107 and B 113 selects pixels having a specific color component in each direction and calculates the weighted average of the pixel values of the pixels selected on the basis of the weight assigned in each direction. The calculation method of the averaging circuit A 107 is different from that of the averaging circuit B 113.

The G calculation circuit 108 calculates the value of the finally omitted G component from the weighted average result for each component obtained from the averaging circuit A 107. The RB calculation circuit 114 calculates the value of the finally omitted R or B component from the weighted average value for each color component obtained from the averaging circuit B 113.

The operation of the above digital camera 100 will be described below.

When a user presses a shutter (not shown), the Single-chip Bayer array CCD 102 senses an optical image from the optical system 101. An image in a 1CCD state in which only one type of color component is available for each pixel is obtained in the 1CCD image buffer 103. The weight calculation circuit A 106 processes each pixel of the image in the 1CCD state in the 1CCD image buffer 103. The processing in the weight calculation circuit A 106 changes depending on the type of color component obtained at the pixel of interest.

When the color component obtained at the pixel of interest is G, the pixel value is directly written in the corresponding pixel position of the G image buffer 109.

On the other hand, when the R or B component is obtained at the pixel of interest, the omitted G component is compensated. Assume that the color component obtained at the pixel of interest is B, as shown in FIG. 2. If the color component obtained at the pixel of interest is R, B is replaced with R, in the following explanation.

As shown in FIG. 2, calculation areas Sj (j is an integer of 1 to 4) in the four directions, i.e., upper, lower, right, and left directions within the neighboring pixels around the pixel of interest in the 5×5 matrix are set. An undulation degree Ej is calculated using the G pixel adjacent to each area Sj by the following equations:

$E1=|B5-B7|+|G4-G6|-\min(|G4-G6|,|G2-G8|)$ $E2=|B5-B9|+|G2-G8|-\min(|G4-G6|,|G2-G8|)$ $E3=|B5-B3|+|G4-G6|-\min(|G4-G6|,|G2-G8|)$ $E4=|B5-B1|+|G2-G8|-\min(|G4-G6|,|G2-G8|)$ (3)

where min(x,y) is a function which returns the smaller of x and y.

The calculated undulation degree Ej is an index which increases when flatness of each area increases. Otherwise, the undulation degree Ej decreases.

The weight calculation circuit A 106 calculates a weight Wj for each direction from the undulation degree Ej as follows:

$Wj=(1/Ej)/W, W=1/E1+1/E2+1/E3+1/E4$ (4)

The weight calculation circuit A 106 outputs the weight Wj to the averaging circuit A 107.

The averaging circuit A 107 calculates a weighted average for each color component using the pixel values in each area Sj on the basis of weights W1 to W4 input from the weight calculation circuit A 107. The averaging circuit A 107 outputs the weighted average to the G calculation circuit 108. More specifically, G6, G8, G4, and G2 are obtained from the areas S1 to S4 for the color component G, and the weighted average is calculated by $Ga=W1*G6+W2*G8+W3*G4+W4*G2$ (5)

For the color component B, B7, B9, B3, and B1 are obtained from the areas S1 to S4 to calculate the weighted average by $Ba=W1*B7+W2*B9+W3*B3+W4*B1$ (6)

Note that since no R components are contained in the areas S1 to S4, the weighted average of the color component R is not calculated.

In the G calculation circuit 108, the finally omitted G component G5 is calculated by G5=Ga+(B5−Ba) from Ga and Ba output from the averaging circuit A 107 and B5 obtained at the pixel of interest. The calculated G component G5 is written in the corresponding pixel position in the G image buffer 109.

When a series of these processes is complete for all the pixels of the image in the 1CCD image buffer 103, an image whose G component omitted is compensated is obtained in the G image buffer 109. The control circuit 118 then operates the RB restoration circuit 110. The RB restoration circuit 110 starts a process for each pixel in the image in the 1CCD image buffer 103. The process changes depending on the type of color component obtained at each pixel from the 1CCD Bayer array CCD 102.

When the color component obtained at the pixel of interest is not G, the value of the pixel of interest is written in the color image buffer 115. The pixel value at the pixel position corresponding to the pixel of interest is read out form the G image buffer 109 and written in the color image buffer 115.

When the color component obtained at the pixel of interest is G, the pixel values of the neighboring pixels around the pixel of interest in the 5×5 matrix are read out from the 1CCD image buffer 103. At the same time, the pixel values of the corresponding neighboring pixels are read out from the G image buffer 109, thereby calculating the undulation degrees in the plurality of directions.

Figure 3A:
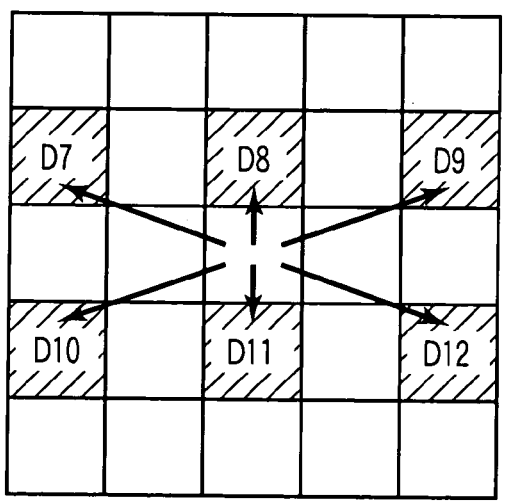
FIGS. 3A and 3B are views for explaining operation (No. 1) when a weight calculation circuit B 112 performs the first operation.
Figure 3B:
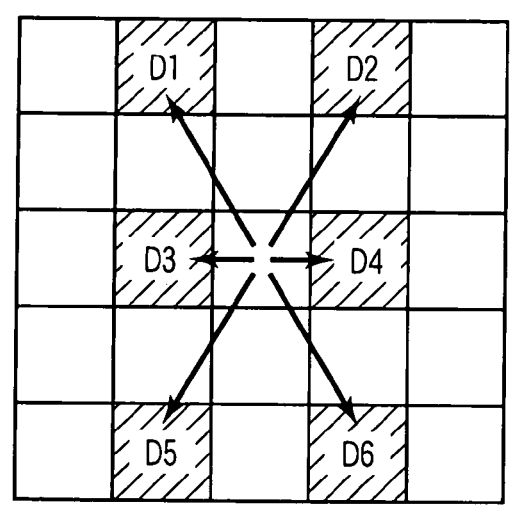
Figures 4, 5A, 5B:
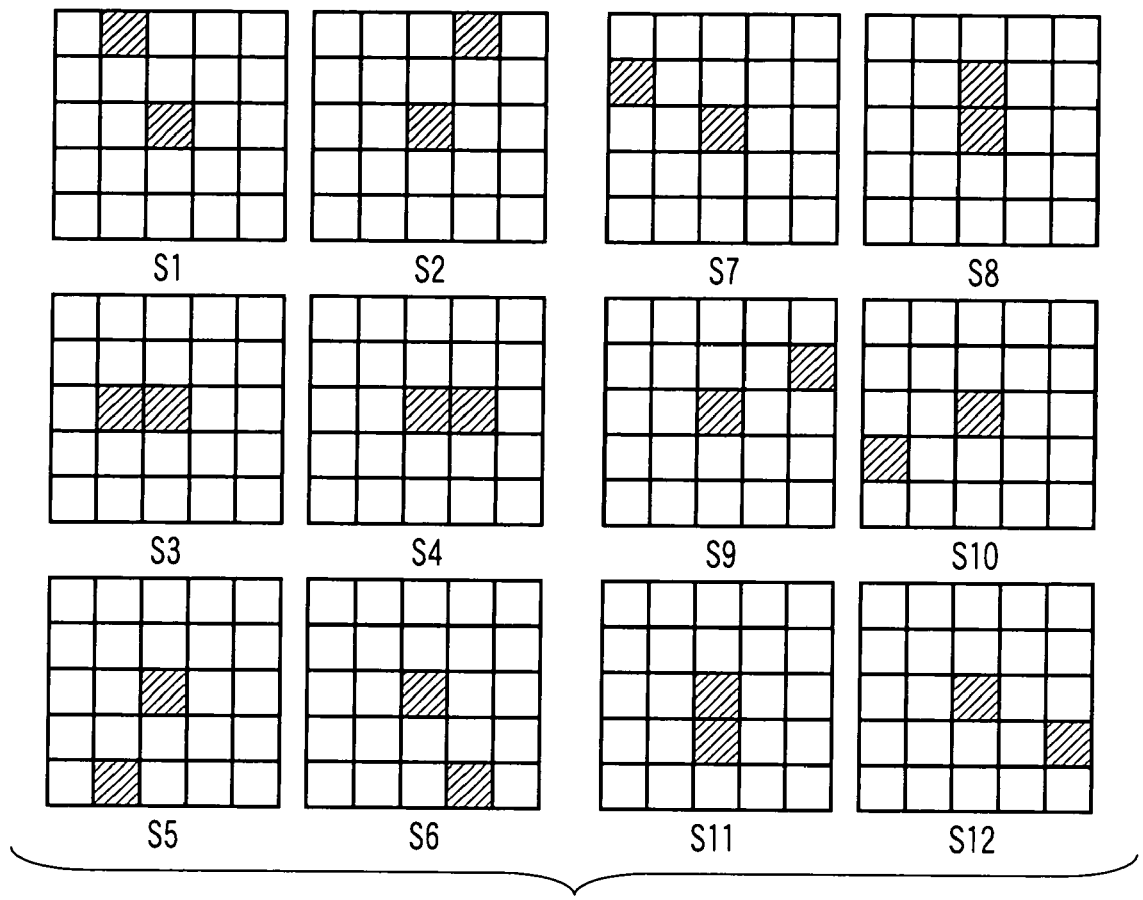
FIG. 4 is a view for explaining operation (No. 2) when the weight calculation circuit B 112 performs the first operation.
FIGS. 5A and 5B are views for explaining operation (No. 3) when the weight calculation circuit B 112 performs the first operation.

The directions subjected to calculations are 12 directions D1 to D12 shown in FIGS. 3A and 3B, and the calculation areas are S1 to S12 in FIG. 4. Each area comprises a pixel of interest and neighboring pixels (a hatched portion in FIG. 3) from which the color component R or B is obtained.

The undulation degree Ej in each direction Dj (j is an integer of 1 to 12) is calculated by a difference between the G components of two pixels contained in each area Sj. For example, when a color component pattern obtained in the neighboring pixels in the 5×5 matrix is as shown in FIG. 5, the undulation degree in the direction D1 is calculated by E1=|G2−G13|, and the undulation degree Ej in the direction D7 is calculated by E7=|G6−G13|.

The weight calculation circuit B 112 calculates the weight in each direction from the undulation degree Ej of each direction Dj.

For D1 to D6

$Wj=(1/Ej)W, W=1/E1+1/E2+1/E3+1/E4+1/E5+1/E6$ (j is an integer of 1 to 6)

For D7 to D12

$$Wj=(1/Ej)W', W'=1/E7+1/E8+1/E9+1/E10+1/E11+1/E12 \text{ (j is an integer of 7 to 12)} \quad (7)$$

These calculation results are output to the averaging circuit B 113. The calculations are made by dividing the directions into two groups, i.e., D1 to D6 and D7 to D12 because the color component patterns obtained by the respective areas are different from each other. The color component patterns obtained by the neighboring pixels in the 5×5 matrix in FIG. 5A are made up of the G and B components in the areas S1 to S6 corresponding to D1 to D6 and the G and R components in the areas S1 to S6 corresponding to D7 to D12. The remaining color component patterns obtained within the 5×5 matrix are shown in FIG. 5B. The G and R components are obtained in the areas S1 to S6 corresponding to D1 to D6, while the G and B components are obtained in the areas S1 to S6 corresponding to D7 to D12.

The averaging circuit B 113 selects pixels except the pixel of interest from the calculation areas Sj (j is an integer of 1 to 12) for each direction formed in the weight calculation circuit B 112. For example, the averaging circuit B 113 selects B2 for the B color component from the area S1 and G2 for the G color component from the area S1. The values of the pixels selected from the corresponding areas are weighted and averaged for the two direction groups, D1 to D6 and D7 to D12, thereby obtaining average values Ra, Ga, and Ba within the neighboring pixels for the respective color components. No calculation is made unless the corresponding color component is contained in the area. The mathematical expressions of weighted averages for FIGS. 5A and 5B are given by:

For FIG. 5A:
Weighted averages in directions D1 to D6:

$$Ba=W1*B2+W2*B4+W3*B12+W4*B14+W5*B22+W6*B24$$

$$Ga1=W1*G2+W2*G4+W3*G12+W4*G14+W5*G22+W6*G24 \quad (8\text{-}1)$$

Weighted averages in directions D7 to D12:

$$Ra=W7*R6+W8*R8+W9*R10+W10*R16+W11*R18+W12*R20$$

$$Ga2=W7*G6+W8*G8+W9*G10+W10*G16+W11*G18+W12*G20 \quad (8\text{-}2)$$

For FIG. 5B:
Weighted averages in directions D1 to D6:

$$Ra=W1*R2+W2*R4+W3*R12+W4*R14+W5*R22+W6*R24$$

$$Ga2=W1*G2+W2*G4+W3*G12+W4*G14+W5*G22+W6*G24 \quad (8\text{-}3)$$

Weighted averages in directions D7 to D12:

$$Ba=W7*B6+W8*B8+W9*B10+W10*B16+W11*B18+W12*B20$$

$$Ga1=W7*G6+W8*G8+W9*G10+W10*G16+W11*G18+W12*G20 \quad (8\text{-}4)$$

When the weighted averages within the neighboring pixels are calculated, the averaging circuit B 113 outputs the weighted average results to the RB calculation circuit 114.

The RB calculation circuit 114 calculates omitted color components B13 and R13 on the basis of the pixel value of the pixel of interest and the outputs from the averaging circuit B 113:

$$B13=Ba+(G13-Ga1)$$

$$R13=Ra+(G13-Ga2) \quad (9)$$

The calculation result is written in a position corresponding to the pixel of interest in the color image buffer 115. The differences between the G component of the pixel of interest and the weighted averages Ga1 and Ga2 are added to Ba and Ra in equations (9) in order to prevent a flat overall unnatural impression caused by nonuse of the pixel of interest itself if Ba and Ra are used as the estimation values of the omitted color components.

When the above process is complete for all the pixels of the image in the 1CCD image buffer 103, an image having the same number of pixels as in the 1CCD image buffer 103 is generated in the color image buffer 115. Each pixel is set in a state wherein all R, G, and B color components are obtained or only the R or B component is omitted. The weight calculation circuit B 112 is then operated again.

Figures 6A, 6B, 6C:
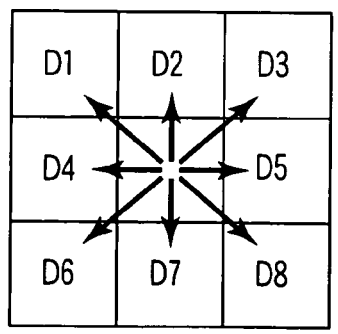
FIGS. 6A, 6B, and 6C are views for explaining operation when the weight calculation circuit B 112 performs the second operation.

The weight calculation circuit B 112 reads out the neighboring pixels of a pixel of interest from the color image buffer 115 and processes the readout pixels. No process is performed when all R, G, and B color components are obtained in the pixel of interest. In a pixel having an omitted color component, the weight calculation circuit B 112 reads out the values of neighboring pixels of the pixel of interest of the 3×3 pixel matrix from the color image buffer 115. The weight calculation circuit B 112 calculates the undulation degrees in the neighboring pixels in the eight directions D1 to D8, i.e., upper, lower, right, and left directions and four diagonal directions, as shown in FIG. 6C. FIG. 6A shows a color component pattern obtained in the neighboring pixels in the 3×3 pixel matrix. The calculation areas are eight areas S1 to S8 each comprising two pixels, i.e., the pixel of interest and any one of eight pixels contained in the neighboring pixels in the 3×3 pixel matrix for the directions D1 to D8, as shown in FIG. 6B. The undulation degree Ej of the direction Dj is evaluated by the difference between the G components of two pixels contained in the area Sj. For example, the undulation degree for the direction D1 is calculated by E1=|G1−G5|; and for D5, E7=|G9−G5|. When the undulation degrees of all the areas are completely calculated, the weights in all directions are calculated by the undulation degrees Ej as follows (j is an integer from 1 to 8):

$$Wj=(1/Ej)/W, W=\Sigma(1/Ek) \text{ (k is an integer from 1 to 8)} \quad (10)$$

The calculation result is output to the averaging circuit B 113. Another pattern in which R and B are replaced with each other in FIG. 6A is obtained as a color component pattern obtained in the neighboring pixels in the 3×3 pixel matrix. In this case, the weight calculation is performed in the same manner as described above.

The averaging circuit B 113 selects a pixel except the pixel of interest from Sj for each direction Dj. The averaging circuit B 113 calculates a weighted average obtained by weighting with the weight Wj the values of pixels selected for the color component G and a color component C (C is one of R and B) omitted in the pixel of interest and by averaging the weighted values:

$$Ca=\Sigma Wj*Cj, Ga=\Sigma Wj*Gj \quad (11)$$

The averaging circuit B 113 outputs the calculated value to the RB calculation circuit 114.

By using the G component G5 already calculated in the pixel of interest and the weighed average value output from the average calculation circuit B 113, the RB calculation circuit 114 estimates as C5=Ca+(G5−Ga) a color component C5 (C is one of R and B) omitted in the pixel of interest. The estimation result is written in the corresponding pixel position in the color image buffer 115.

When the above process is complete, a color image whose omitted color components are restored in all pixels is obtained in the color image buffer 115. The image quality adjustment circuit 116 performs processing such as color conversion, edge enhancement, graylevel conversion for the resultant color image. The processed image is recorded on a recording medium (not shown) by the recording circuit 117, thus completing the image sensing operation of the digital camera 100.

A number of modifications to this embodiment may be proposed. The first preferred modification is the way of weight calculation in the weight calculation circuit A 106. The weight calculation circuit A 106 performs weight calculation on the basis of the calculated undulation degrees in the respective directions. Equations (4), (7), and (10) perform identical weighting calculations regardless of the absolute magnitudes of the undulation degrees. However, in practice, when the undulation degrees are uniformly small in all the directions, the weighting levels are preferably made uniform as much as possible because the uniformly small undulation degrees are supposed to be dominated by a noise influence. For this reason, equation (10) may be modified as follows, and a new weight W'j is used in place of the weight Wj:

$W'j = Vj/W'$, $W' = \Sigma Vk$ ($k$ is an integer of 1 to 8)

$$Vj = \gamma * Wj + (1-\gamma) * 1/8, \gamma = h(\max(E1, E2, \ldots, E8)) \quad (12)$$

where Wj is the value calculated by equation (10), h(x) is a monotonically decreasing function of x, and max(v1, v2, ..., v8) is a function of giving the maximum value of the values vj (j is an integer of 1 to 8). The larger the absolute magnitude of the undulation degree in the neighboring pixels, the smaller γ, and vice versa. As a result, weights are calculated as follows. When a noise influence is relatively small, weighting comes close to that calculated by equation (10). However, when the noise influence is relatively large, weighting comes close to the uniform weighting.

Figure 7:
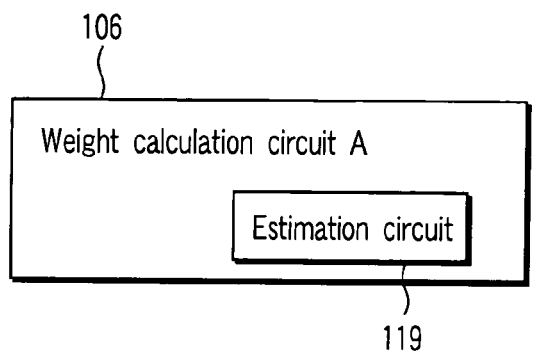
FIG. 7 is a diagram of an estimation circuit 119 according to the second preferred modification to the first embodiment of the present invention.

The second preferred modification is a change in calculation method of the weight calculation circuit A 106. The weight calculation circuit A 106 evaluates the undulation degree in each direction in accordance with a difference between G components. In some image pattern, a G component rarely changes, and only R and B components change. To cope with this, an undulation degree in each direction Dj is calculated using a color component except G in FIG. 5A or 5B. For this purpose, the weight calculation circuit A 106 comprises an estimation circuit 119 shown in FIG. 7 and estimates the value of a color component except G in the pixel of interest. For example, in the case of FIG. 3, B'=(B12+B14)/2 is calculated as the estimation value of the B component of the pixel of interest in the directions D1 to D6. An undulation degree Ej (j is an integer of 1 to 6) is calculated as Ej=|Gk−G13|+|B'−Bk|.

In the above equation, k is the number of a pixel except the pixel of interest contained in the area Sj. R'=(R8+R18)/2 is calculated as the estimation value of the R component of the pixel of interest in the directions D7 to D12, and Ej=|Gk−G13|+|R'−Rk| is calculated as an undulation degree Ej (j is an integer of 7 to 12) where k is defined as in the directions D1 to D6.

Similarly, in FIG. 6A, B'=(B1+B3+B7+B9)/4 is calculated as the estimation value of the B component in the pixel of interest, and Ej=|G5−Gk|+|B'−Bk| is calculated as the undulation degree in the directions D1 to D8, where k is the number of a pixel except the pixel of interest contained in the area Sj.

Figure 8:
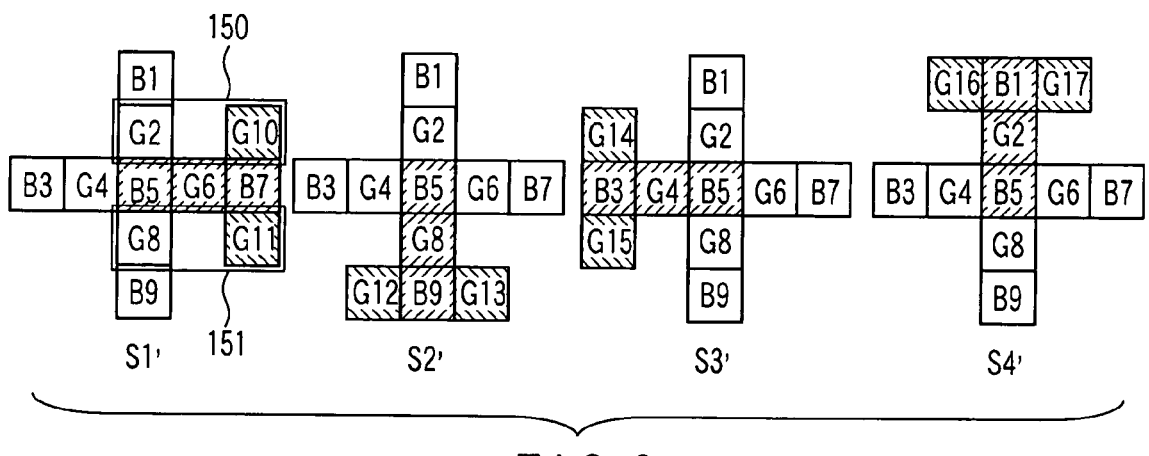
FIG. 8 is a view for explaining weight calculation areas set in the third preferred modification to the first embodiment of the present invention.

The third preferred modification can be exemplified as a modification of the calculation in the weight calculation circuit A 106. In this modification, a G pixel is added to an area for calculating undulation degrees in the upper, lower, right, and left directions, as shown in FIG. 8. For example, an undulation degree E1 in the right direction is calculated including the difference between rectangular areas 150 and 151 by:

$$E1 = |B5 - B7| + |G4 - G6| - \quad (13)$$
$$\min(|G4 - G6|, |G2 - G8|) +$$
$$\min(|G2 - G10|, |G8 - G11|)$$

In this manner, restoration precision for an oblique edge can be improved by combining pixel value difference of the areas in directions which are parallel but positions are shifted from each other.

Circuit processes in the digital camera in this embodiment have been described above. However, circuit processes may be performed by software processes using flows in FIGS. 9 and 10. These flows are performed using two memory areas InImg and OutImg. A pixel which is output from the Single-chip Bayer array CCD 102 and in which two types of color components are omitted is written in InImg and processed. A color image in which three color components are obtained in each pixel is obtained in OutImg. The steps in the flows will now be described.

In step S1, the InImg pixel value is copied to OutImg. In this case, a type C of a color component obtained at each pixel position of InImg is calculated, and the calculated value is written as the value of the color component C in the corresponding pixel of OutImg. In step S2, InImg is scanned to search for whether a pixel having a color component R or B is present. If NO in step S2, the flow advances to step S6. If YES in step S2, the flow advances to step S3. Assume that the corresponding pixel is defined as X.

In step S3, upper, lower, right, and left areas are defined in neighboring pixels around the pixel X in the 5×5 matrix, and weights in the respective directions are calculated using equations (3) and (4). Note that equation (4) represents a case in which the B component is obtained in the pixel X. When an R component is obtained in the pixel X, B is replaced with R.

In step S4, the values of the pixels having G color components in the upper, lower, right, and left areas of the pixel X are weighted with the weights of the respective directions calculated in step S3. The weighted values are averaged to obtain Ga according to equation (5). The values of pixels having the color component C and located at the upper, lower, right, and left positions of the pixel X are weighted with the weight of each direction calculated in step S3, and the weighted values are averaged to obtain Ca with respect to the color component C (R or B) obtained in the pixel X. The calculation expression for B in place of C is given by equation (6).

In step S5, an omitted G component value (similarly defined as G5) is calculated by G5=Ga+(C5−Ca) using the weighted average calculated in step S4 and the value of the pixel X (this pixel value is defined as C5 in correspondence with FIG. 2. C is one of R and B). G5 is written in OutImg.

Figure 10:
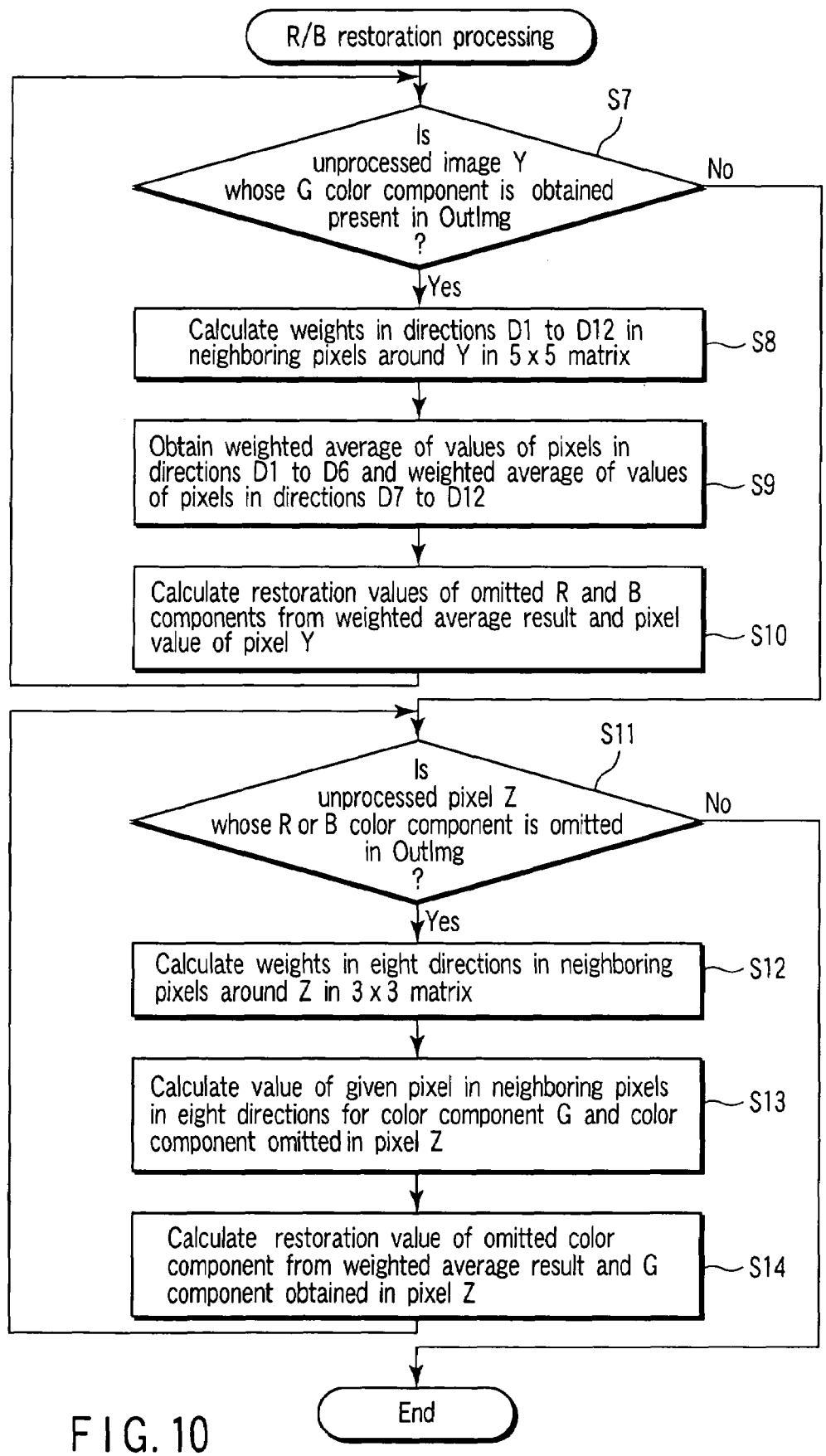
FIG. 10 is a flowchart of RB restoration processing in the software processing corresponding to the first embodiment of the present invention.

In step S6, the RB restoration process is performed in accordance with the steps of the flow in FIG. 10. The steps in the RB restoration process flow will be described below.

In step S7, OutImg is scanned to search whether an unprocessed pixel having only the color component G is present. If NO in step S7, the flow immediately advances to step S11. Otherwise, the flow advances to step S8. A pixel of interest as an unprocessed pixel is called Y hereinafter.

In step S8, two sets of six directions, i.e., the directions D1 to D6 and the directions D7 to D12 shown in FIG. 3 are set in the neighboring pixels of the pixel Y in the 5×5 pixel matrix. The weights in the respective directions are calculated. In each direction, an absolute value Ej (j is an integer of 1 to 12) of a difference between the value of the G component of the hatched pixel in FIG. 3 and the value of the G component of the pixel Y is obtained. The weight for each set is calculated by equations (7).

In step S9, the values of the hatched pixels shown in FIG. 3 for each of the directions D1 to D6 and the directions D7 to D12 are weighted by the weights calculated in step S8 for the respective color components, and the weighted values are averaged. The color components G and R or the color components G and B are obtained in the hatched pixels. The weighted average results for the two different color components are obtained. The types of color components and calculation expressions are represented by equations (8-1) to (8-4) depending on whether a color component pattern obtained near the pixel Y is shown in FIG. 5A or 5B.

In step S10, omitted R and B components (similarly defined as R13 and B13 hereinafter) are calculated by equations (9) using the weighted average results obtained in step S9 and the pixel value (defined as G12 in correspondence with FIG. 5A or 5B). The calculated color components are written in OutImg.

In step S11, OutImg is scanned to search for a pixel having an omitted color component. If such a pixel is not present, the processing is ended. Otherwise, the flow advances to step S12. A pixel of interest as a pixel having an omitted color component is defined as Z hereinafter.

In step S12, eight directions shown in FIG. 6C are set in the neighboring pixels of the pixel Z in the 3×3 pixel matrix, and the weights in the respective directions are calculated. An absolute value Ej (j is an integer of 1 to 8) of a difference between a neighboring pixel in each direction and the pixel of interest as the pixel Z is obtained. A weight is then calculated by equation (10).

In step S13, the values of corresponding color components of pixels present in each direction are weighted and averaged by equation (11) with respect to the color components C and G omitted in the pixel Z.

In step S14, an omitted color component (similarly defined as C5) is calculated by C5↑Ga+(C5−Ca) using the weighted average result in step S13 and the G component (defined as G5 in correspondence with FIG. 6A) obtained in the pixel Z. The calculated value is written in OutImg.

Note that this embodiment and its modifications incorporate inventions described in claims 1, 2, 3, 4, 5, 6, 7, 10, 14, 15, 16, 17, 18, 21, and 22.

Second Embodiment

Figure 11:
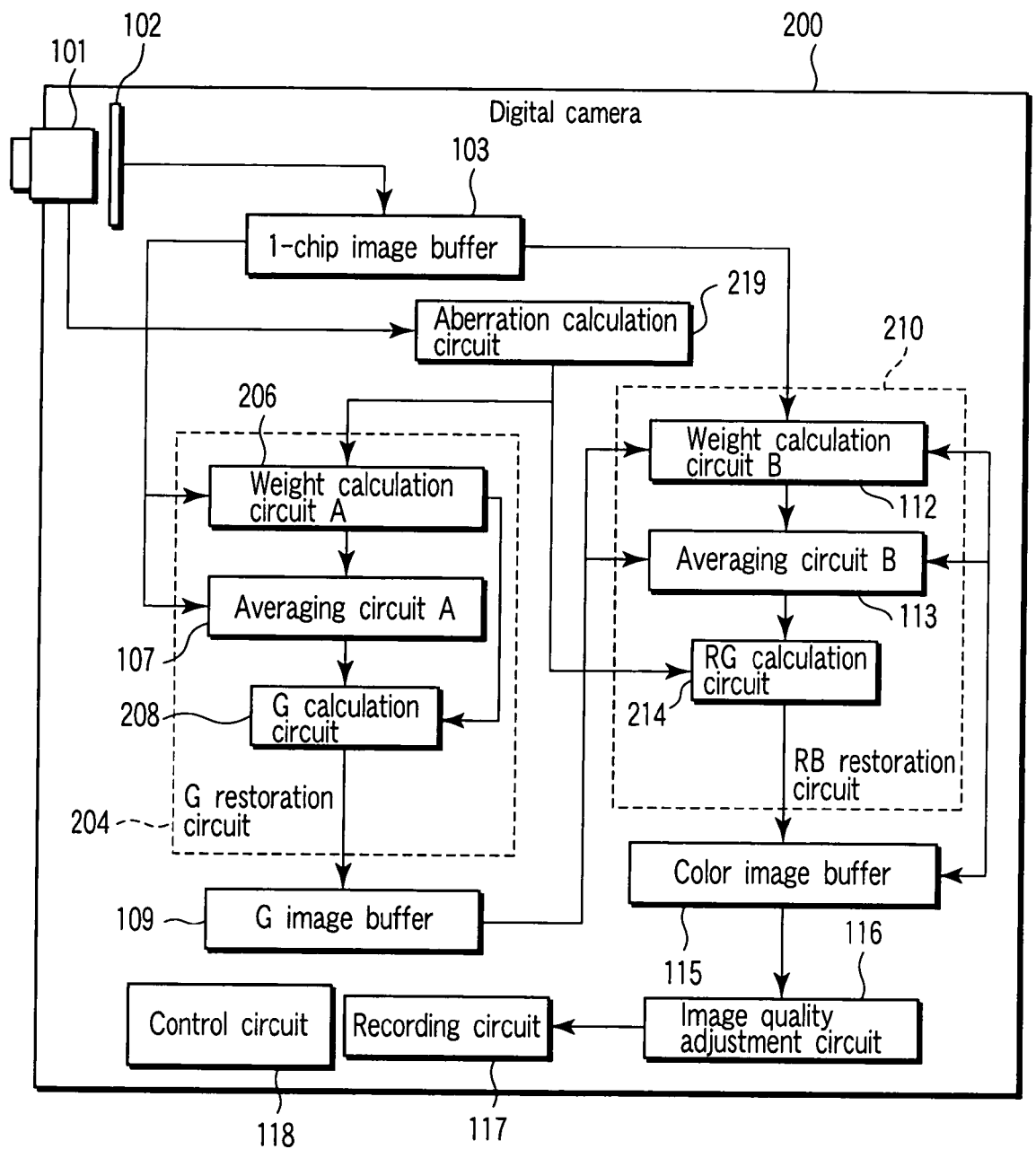
FIG. 11 is a block diagram showing the schematic arrangement of a digital camera 200 serving as an image processing apparatus according to the second embodiment of the present invention.

FIG. 11 is a block diagram showing the schematic arrangement of a digital camera 200 serving as an image processing apparatus according to the second embodiment of the present invention. The second embodiment has many parts common to the first embodiment and only parts different from the first embodiments will be described in the second embodiment. As in the first embodiment, the present invention is applied to a digital camera in the second embodiment. The second embodiment is the same as the first embodiment except that an interpolation processing characteristic is changed depending on the state of an optical system 101. For this purpose, as shown in FIG. 11, an aberration calculation circuit 219 is arranged to calculate a color misregistration amount of an edge at each pixel position in a 1CCD image buffer 103. A weight calculation circuit A 206 and G calculation circuit 208 in a G restoration circuit 204 and a weight calculation circuit B 112 and RB calculation circuit 214 in an RB restoration circuit 210 are controlled by the color misregistration amount.

The function of the digital camera 200 will be described below, centered on the difference from the first embodiment. When a user presses a shutter (not shown), as in the first embodiment, an optical image from the optical system 101 is sensed by a signal-chip Bayer array CCD 102. An image in a 1CCD state having only one color component per pixel is obtained in the 1CCD image buffer 103. The focal length of the optical system 101 and an object distance are output to the aberration calculation circuit 219.

The weight calculation circuit A 206 processes each pixel of the image in the 1CCD state in the 1CCD image buffer 103. In this case, when the color component obtained in the pixel of interest is G, the same process as in the first embodiment is performed. However, when the color component R or B is obtained in the pixel of interest, undulation degrees are calculated in the four directions, i.e., upper, lower, right, and left directions near the pixel of interest as in the first embodiment. Prior to this calculation, coordinates (x,y) of the pixel of interest are output to the aberration calculation circuit 219.

The aberration calculation circuit 219 holds an LUT in which color misregistration amounts of the color components R and B with respect to the color component G are recorded for each set comprising three discrete values, i.e., the focal length, object distance, and the distance from the optical axis. When the coordinates (x,y) are input to the aberration calculation circuit 219, it calculates a square D of the distance between the coordinates (cx,cy) corresponding to the optical axis and the coordinates (x,y) of the pixel of interest in accordance with $D=(cx-x)^2+(cy-y)^2$. A color misregistration amount Ar of the color component R with respect to the color component G and a color misregistration amount Ab of the color component B with respect to the color component G in the coordinates (x,y) are calculated using the already input focal length and object distance, the calculated D, and the data held in the LUT in accordance with a known table interpolation method. The calculated values are then output to the weight calculation circuit A 206.

Figure 12A:
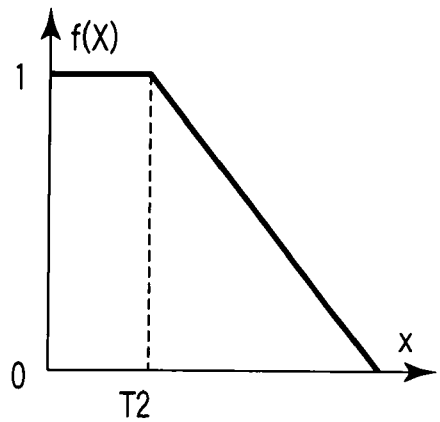
FIGS. 12A and 12B are views for explaining functions for controlling weight calculations in accordance with color misregistration amounts.
Figure 12B:
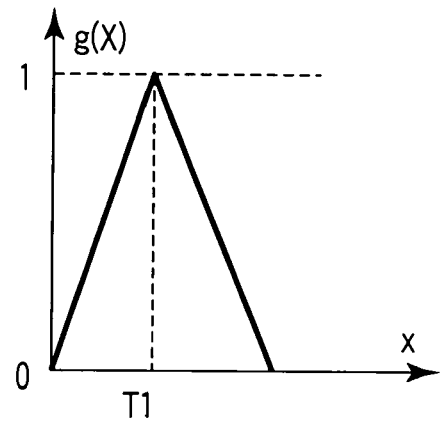

The weight calculation circuit A 206 sets areas S1 to S4 shown in FIG. 2 in the upper, lower, right, and left directions of the pixel of interest and calculates undulation degrees Ej (j is an integer of 1 to 4) of the respective areas by the following equations. Like the first embodiment, a case is exemplified wherein the color component obtained in the pixel of interest is B as shown in FIG. 2.

$$E1=\alpha^*|B5-B7|+|G4-G6|-\min(|G4-G6|,|G2-G8|)$$

$$E2=\alpha^*|B5-B9|+|G2-G8'|-\min(|G4-G6|,|G2-G8|)$$

$$E3=\alpha^*|B5-B3|+|G4-G6'|-\min(|G4|G6|,|G2-G8|)$$

$$E4=\alpha^*|B5-B1|+|G2-G8'|-\min(|G4-G6|,|G2-G8|)$$

$$\alpha=1-f(||G4-G6|-|G8-G12||)^*g(\max(Ar,Ab)) \quad (14)$$

where f and g are functions shown in FIGS. 12A and 12B. Y1 and T2 in FIGS. 12A and 12B are predetermined threshold values. In equations (14), max(x,y) represents a larger one of x and y. In equations (14), α is characterized in that it comes close to zero when the color misregistration evaluation amount Ar or Ab is close to T1 and a horizontal difference |G4−G6| and vertical difference |G2−G8| of the G component are close to each other; otherwise, α comes close to 1. As a result, the color misregistration amount is calculated for an oblique edge near one pixel, and the undulation degree is calculated on the basis of only the neighboring color component G.

The subsequent weight calculation in the weight calculation circuit A 206 is the same as in the first embodiment. The calculation result is output to an averaging circuit A 107. Unlike in the first embodiment, the color misregistration amounts Ar and Ab calculated by the aberration calculation circuit 219 are output to the G calculation circuit 208.

The process in the averaging circuit A 107 is the same as in the first embodiment. The pixel values in the upper, lower, right, and left directions near the pixel of interest are weighted and averaged for each color component by using the weights calculated in the weight calculation circuit A 206. Since a pixel having a color component R is not present in the areas set in FIG. 2, only weighted average values Ba and Ga of the color components B and G are obtained.

The G calculation circuit 208 calculates a finally omitted G component GS from the pixel value of the pixel of interest and the weighted average for each color component output from the averaging circuit A 107. The calculated G component G5 is written in the corresponding pixel position in the G image buffer 109. The calculation expressions in the second embodiment are slightly different from those in the first embodiment. The following calculations are performed using the color misregistration amount Ab from the weight calculation circuit A 206:

$$G5=Ga+\beta_b^*(B5-Ba)$$

$$\beta_b=1-g(Ab) \quad (15)$$

where g is the function shown in FIG. 12B.

A series of operations described above are performed for all the pixels of the image in the 1CCD image buffer 103. An image in which the omitted G component is compensated is obtained in the G image buffer 109. A control circuit 118 then operates an RB restoration circuit 210. In the RB restoration circuit 210, a weight calculation circuit B 112 starts a process for each pixel in the image in the 1CCD image buffer 103, but the calculation contents are the same as in the first embodiment. As a result, weights W1 to W6 and weights W7 to W12 are obtained for the set of the directions D1 to D6 and the set of the directions D7 to D12 shown in FIG. 5A near the pixel of interest whose color component G has been obtained. An averaging circuit B 113 is then operated, and its contents are the same as in the first embodiment. Ba and Ga1 are obtained as the weighted average results in the directions D1 to D6 and Ra and Ga2 are obtained as the weighted average results in the directions D7 to D12 when the color component pattern obtained near the pixel of interest is shown in FIG. 5B.

The RB calculation circuit 214 is then operated. Unlike the first embodiment, coordinates (x,y) of the pixel of interest are output to the aberration calculation circuit 219. The aberration calculation circuit 219 performs the same process as in compensating for the omitted G component. The aberration calculation circuit 219 calculates the color misregistration amount Ar of the R component with respect to the G component and the color misregistration amount Ab of the B component with respect to the G component in the pixel of interest and outputs them to the RB calculation circuit 214.

RB calculation circuit 214 calculates the R and B components omitted in the pixel of interest by using the weighted average result from the averaging circuit B 113 and the color misregistration amounts Ar and Ab:

$$B13=Ba+\beta_b^*(G13-Ga1), R13=Ra+\beta_r^*(G13-Ga2)$$

$$\beta_r=1-g(Ar), \beta_b=1-g(Ab) \quad (16)$$

The calculation results are written in the position corresponding to the pixel of interest in a color image buffer 115. In equations (16), g is the function shown in FIG. 12B.

When the above processes are complete for all the pixels of the image in the 1CCD image buffer 103. An image having the number of pixels equal to that in the 1CCD image buffer 103 is generated in the color image buffer 115. All color components, i.e., R, G, and B are obtained in each pixel, or only the R or B component is omitted in each pixel. The weight calculation circuit B 112 is operated again, and its processing contents are the same as in the first embodiment. The weight calculation circuit B 112 calculates weights Wj (j is an integer of 1 to 8) for the neighboring directions D1 to D8 shown in FIG. 6C for the pixels in which color components are omitted. The calculated weights are output to the averaging circuit B 113.

The processing contents of the averaging circuit B 113 are the same as in the first embodiment. The averaging circuit B 113 calculates weighted averages Ca and Ga of the neighboring pixels with respect to the color component C (C is one of R and B) and the color component G which are omitted in the pixel of interest. The calculated averages are output to the RB calculation circuit 214.

The RB calculation circuit 214 outputs the coordinates (x,y) of the pixel of interest to the aberration calculation circuit 219. The aberration calculation circuit 219 obtains the color misregistration amount Ar of the R component with respect to the G component and the color misregistration amount Ab of the B component with respect to the G component in the pixel of interest. The color component C (R or B in accordance with the omitted color component) omitted in the pixel of interest is calculated using the weighted average result from the averaging circuit B 113 and the color misregistration amount Ac (c is r or b depending on whether the omitted color component is R or B):

$$C5=Ca+\beta_c^*(G5-Ga)$$

$$\beta_c=1-g(Ab) \quad (17)$$

The calculation results are written at the position corresponding to the pixel of interest in the color image buffer 115.

When all the processes described above are complete, a color image in which the omitted color components in all pixels are restored is obtained in the color image buffer 115. The subsequent operation is the same as in the first embodiment. The resultant color image undergoes processes such as color conversion, edge enhancement, grayscale conversion by an image quality adjustment circuit 116. The processed image is recorded on a recording medium (not shown) by a recording circuit 117, thereby completing the image sensing operation of the digital camera 200.

Figure 13:
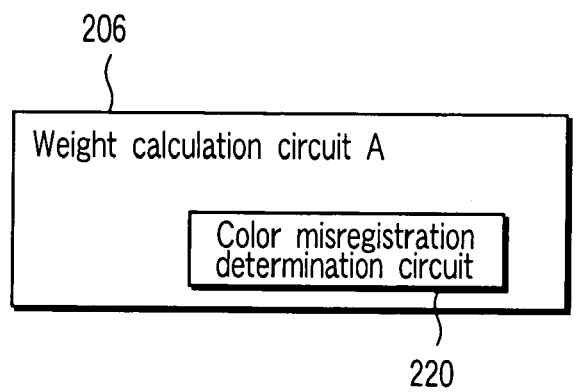
FIG. 13 is a diagram of a color misregistration determination circuit 220 in a preferred modification to the second embodiment of the present invention.

This embodiment can be variously modified. According to a preferred modification, color misregistration is estimated at each pixel position to control interpolation in the absence of the aberration calculation circuit 219. More specifically, as shown in FIG. 13, a color misregistration determination circuit 220 having the following function is arranged in the weight calculation circuit A 206. In this case, the weight calculation circuit A 206 calculates the undulation degrees Ej (j is an integer of 1 to 4) in the upper, lower, right, and left directions using equations (14). Since the aberration calculation circuit 219 is absent, Ar and Ab in equations (14) are set to zero for calculations. The color misregistration determination circuit 220 is then operated to determine one of the undulation degrees E1 to E4 which is the lowest. Two color misregistration determination areas are formed on the two sides of an area Sk in a direction k which gives the lowest undulation degree. For example, if k is 1, the color misregistration determination areas are two areas indicated by 150 and 151 in S1' in FIG. 8. A difference between G components is calculated in the same direction as in calculating the undulation degree Ek in each area and defined as a minimum value Δ. A difference between pixels having color components except G is calculated in the area Sk and defined as Δ'. If k=1, then Δ=min(|G2−G10|,|G8−G11|), and Δ'=|B5−B7|. Finally, the color misregistration circuit 220 calculates a color misregistration amount A by:

$$A = \begin{cases} T1 & (\Delta' < T3 \text{ and } \Delta > T4) \\ 0 & (\text{otherwise}) \end{cases} \quad (18)$$

where T1 is the predetermined value shown in FIG. 12B, and T3 and T4 are the preset threshold values. The weight calculation circuit A 206 calculates the undulation degree Ej (j is an integer from 1 to 4) in each direction again. In this case, the calculations are made assuming that Ar and Ab in equations (14) are set to A each. The weights are calculated from the undulation degrees in accordance with the method described above and output to the averaging circuit A 107.

Figure 9:
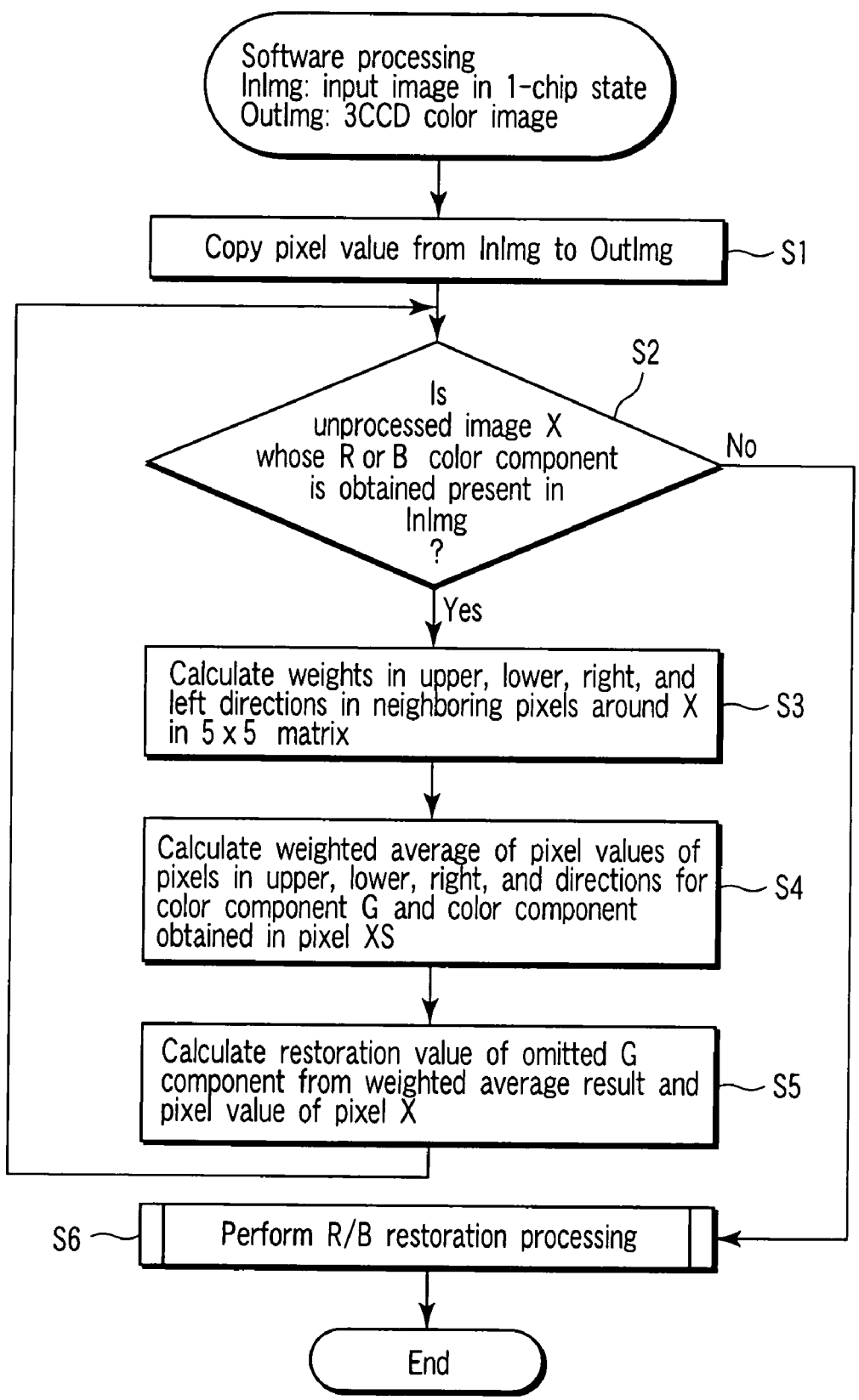
FIG. 9 is a flowchart showing software processing corresponding to the first embodiment of the present invention.
Figure 14:
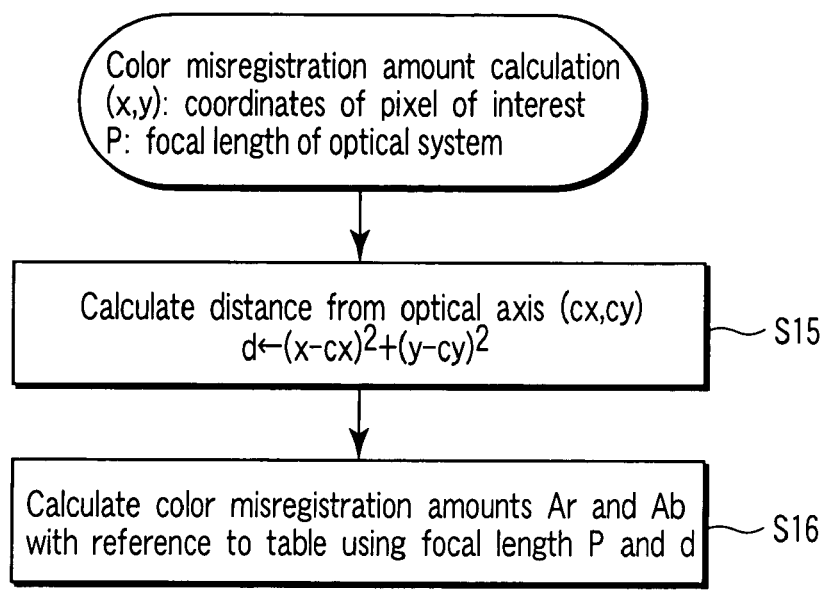
FIG. 14 is a flowchart of a color misregistration amount calculation in software processing corresponding to the second embodiment of the present invention.
Figures 15A, 15B, 15C:
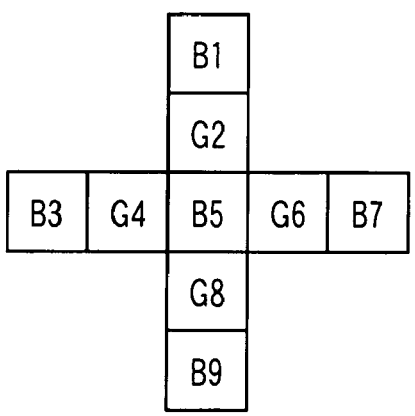
FIGS. 15A, 15B, and 15C are views for explaining the prior art.

This embodiment has exemplified circuit processes in the digital camera. The circuit processes can be replaced with software processes. In this case, the flow is almost the same as shown in FIGS. 9 and 10 in the first embodiment. The processing contents of steps S3, S5, S10, and S14 are changed, and a flow shown in FIG. 14 is added. Only points different from the first embodiment will be described below.

As for step S3 in FIG. 9, the weighting calculation expressions are changed from equations (3) to equations (14). As for step S5, the omitted G component value (similarly defined as G5 hereinafter) is calculated by equations (15) using the weighted average calculated in step S4 and the pixel value (defined as G5 in correspondence with FIGS. 3A and 3B. C is one of R and B) of the pixel X. The calculation results are written in OutImg. As for step S10, equations (16) are used in place of equations (9). As for step S14, the omitted color component (similarly defined as C5) is obtained by equations (17) on the basis of the weighted average result in step S13, and the G component (defined as G5 in correspondence with FIG. 6A) obtained in the pixel Z. The obtained color component is written in OutImg.

When the color misregistration amounts Ar and Ab are required in steps S3, S5, S10, and S14, color misregistration amounts are calculated using the flow in FIG. 14 on the basis of the coordinates of the pixel of interest (X, Y, or Z) and a focal length P of the optical system 101 which is given as a parameter.

Referring to FIG. 14, in step S15, a square d of a distance from the optical axis is obtained using coordinates (cx,cy) on the image of the optical axis of the optical system 101 and the given coordinates (x,y). In step S16, the color misregistration amounts given in the form of a table in a memory advance are looked up using as indices the square d of the distance from the optical axis and the focal length P of the optical system which is given as a parameter, thereby obtaining color misregistration amounts Ar and Ab at the given coordinates.

This embodiment and its modifications incorporate the inventions described in claims 1, 2, 3, 7, 8, 9, 10, 11, 12, 13, 14, 15, 16, 17, 18, 19, 20, 21, 22, and 23.

(Appendix)

1. An image processing apparatus which inputs an image obtained by sensing an optical image by an imaging system, compensates an omitted color component, and outputs a color image, comprising:

a weight setting unit which sets a weight Wk in each direction Sk (k is an integer from 1 to n) of a plurality of directions S1, S2, . . . , Sn (n is an integer of not less than 1) starting from a pixel of interest in a predetermined neighborhood the pixel of interest;

an average value calculation unit which calculates a weighted average of pixel values Vk of pixels having a specific color component and located on each direction Sk (k is an integer from 1 to n) near the predetermined size by using weights W1 to Wn of the pixel values V1 to Vn; and a restoration unit which causes the average calculation unit to calculate weighted averages of a plurality of types of color components and restores a value of an omitted color component of the pixel of interest on the basis of the weighted average result and the pixel value of the pixel of interest.

(Corresponding Embodiments)

In the first embodiment, the weight setting unit corresponds to at least the weight calculation circuit A 106 and weight calculation circuit B 112, the average calculation unit corresponds to at least the averaging circuit A 107 and averaging circuit B 113, and the restoration unit corresponds to at least the G calculation circuit 108 and RB calculation circuit 114.

In the second embodiment, the weight setting unit corresponds to at least the weight calculation circuit A 206, weight calculation circuit B 112, and aberration calculation circuit 219, the average calculation unit corresponds to at least the averaging circuit A 107 and the averaging circuit B 113, and the restoration unit corresponds to at least the G calculation circuit 208 and RB calculation circuit 214.

(Function/Effect)

The weight setting unit assigns weights in neighboring pixels of the pixel of interest in the respective directions of a plurality of directions. The average calculation unit calculates the weighted average of the values of the neighboring pixels on the basis of the weights. The restoration unit calculates an omitted color component on the basis of the weighted average result and the pixel value of the pixel of interest. The omitted color component can be restored in higher precision than simple interpolation.

2. An image processing apparatus according to 1, wherein the weight setting unit selects for a predetermined color component at least one set having two pixels parallel to said each direction Sk in the predetermined neighborhood and having the predetermined color component and calculates the weight Wk for said each direction Sk on the basis of a pixel value difference of each set.

(Corresponding Embodiments)

The corresponding embodiments are the same as "Corresponding Embodiments" described in 1.

(Function/Effect)

The weight setting unit calculates a pixel value difference between two pixels which have corresponding color components and parallel to a direction along which a weight is to be calculated. The weight setting unit calculates a weight on the basis of the pixel value difference. Omitted color components can be optimally restored for a variety of edge patterns.

3. An image processing apparatus according to 2, wherein the weight setting unit calculates the pixel value differences of said each set for a plurality of types of color components and determines the weight Wk for said each direction Sk on the basis of a sum of products of the pixel value differences and a predetermined coefficient.

(Corresponding Embodiments)

The corresponding embodiments are the same as "Corresponding Embodiments" described in 1.

(Function/Effect)

The weight setting unit calculates a weight by mixing pixel value differences for a plurality of types of color components. For this reason, omitted color components can be optimally restored for an edge pattern which cannot be coped with by using a pixel value difference for a single color component.

4. An image processing apparatus according to 1, wherein the weight setting unit comprises an estimation unit which estimates an approximate value of a predetermined color component of the pixel of interest in the predetermined neighborhood, and calculates the weight Wk for said each direction Sk on the basis of the pixel value of the pixel located on said each direction Sk and having the predetermined color component and a difference between the approximate values.

(Corresponding Embodiment)

This corresponds to at least the second preferred modification. The estimation unit corresponds to at least the estimation circuit 119.

(Function/Effect)

The estimation unit estimates the approximate value of a predetermined color component of the pixel of interest within the neighboring pixels. The weight setting unit calculates a weight on the basis of the estimation result and a difference between the pixel values of the neighboring pixels. An omitted color component can be optimally restored for an edge pattern in which a change in value of the predetermined color component is large but changes in remaining color components are small within the neighboring pixels.

5. An image processing apparatus according to 1, wherein the weight setting unit selects a plurality of sets each having the two pixels parallel to said each direction Sk in the predetermined neighborhood and having the predetermined color component and calculates a minimum value of the pixel value differences of each set.

(Corresponding Embodiment)

This corresponds to at least the third preferred modification. A plurality of sets of pixels correspond to the rectangular areas 150 and 151 in FIG. 8.

(Function/Effect)

A plurality of sets each having two pixels having a predetermined color component are set, and a minimum value of a pixel value difference in each set is calculated to cope with a variety of edge patterns in the neighboring pixels with higher precision.

6. An image processing apparatus according to any one of 2, 3, and 5, wherein the weight setting unit obtains a maximum value of the pixel value differences after the pixel value difference for said each direction Sk is calculated for all integers of 1 to n and calculates weights so as to equalize weights in the respective directions when the magnitudes of the maximum values are smaller.

(Corresponding Embodiment)

This corresponds to at least the first preferred modification.

(Function/Effect)

When the maximum value of the pixel value differences in a plurality of directions decreases, the weights are calculated to equalize the weights in the respective directions, thereby reducing the adverse effect of noise on the weight calculation result.

7. An image processing apparatus according to any one of 3 to 5, wherein the weight setting unit calculates the weight Wk for said each direction so that each weight is in inverse proportion to the pixel value difference for said each direction Sk and the sum of the weights becomes 1.

(Corresponding Embodiments)

The corresponding embodiments are the same as "Corresponding Embodiments" described in 1.

(Function/Effect)

Since a weight increases in a direction along which a change in pixel value is small, an interpolation proportion in a direction along an edge in the total omitted color component restoration result increases. An omitted color component can be restored with higher precision for even an edge portion.

8. An image processing apparatus according to any one of 2, 3, and 5, wherein the weight setting unit has an evaluation unit which evaluates an edge color misregistration amount between color components in the pixel of interest and changes a weight calculation method in accordance with an evaluation result of the color misregistration evaluation unit.

(Corresponding Embodiment)

The weight setting unit corresponds to at least the weight calculation circuit A 206 and aberration calculation circuit 219. The color misregistration evaluation unit corresponds to at least the aberration calculation circuit 219 and the color misregistration determination circuit 220 of a preferred modification.

(Function/Effect)

A failure in an optimal weight calculation at an edge portion in the presence of color misregistration can be prevented.

9. An image processing apparatus according to 8, wherein the weight setting unit changes the weight calculation method by changing the predetermined coefficient in accordance with an evaluation result in the color misregistration evaluation unit.

(Corresponding Embodiment)

The corresponding embodiment is the same as "Corresponding Embodiment" described in 8. The predetermined coefficient is a.

(Function/Effect)

Whether a calculation is made using a plurality of color components or using a single color component can easily be changed in calculating weights. A failure in optimal weight calculation at an edge portion in the presence of color misregistration can be prevented.

10. An image processing apparatus according to 1, wherein the restoration unit multiplies predetermined coefficients by the weighted average results for the plurality of color components and the value of the pixel of interest, and add the products to obtain a value of the omitted color component.

(Corresponding Embodiments)

The corresponding embodiments are the same as (Corresponding Embodiments) described in 1.

(Function/Effect)

An omitted color component is restored by mixing pixel value differences for a plurality of types of color components. An omitted color component can be optimally restored for an edge pattern which cannot be coped with by restoration based on a single color component.

11. An image processing apparatus according to 10, wherein the restoration unit comprises a color misregistration evaluation unit which evaluates a color misregistration amount of an edge between color components in the pixel of interest and changes a calculation for the omitted color component in accordance with an evaluation result in the color misregistration evaluation unit.

(Corresponding Embodiment)

The restoration unit corresponds to at least the RB calculation circuit 214. The color misregistration evaluation unit corresponds to the aberration calculation circuit 219 and the color misregistration determination circuit of the preferred modification.

(Function/Effect)

The degradation in an omitted color component restoration result at an edge portion in the presence of color misregistration is prevented, which assures that the result is not worse than that in simple interpolation.

12. An image processing apparatus according to 10, wherein the restoration unit comprises a color misregistration evaluation unit which evaluates a color misregistration amount of an edge between color components in the pixel of interest and changes the predetermined coefficient in accordance with the evaluation result of the color misregistration evaluation unit.

The corresponding embodiment is the same as "Corresponding Embodiment" described in 11. The predetermined coefficients are βr and βb.

(Function/Effect)

The degradation in an omitted color component restoration result at an edge portion in the presence of color misregistration is prevented, which assures that the result is not worse than that in simple interpolation.

13. An image processing apparatus according to any one of 8, 11, and 12, wherein the color misregistration evaluation unit evaluates an edge color misregistration amount between color components on the basis of chromatic aberration of the optical image.

(Corresponding Embodiment)

The color misregistration evaluation unit corresponds to at least the aberration calculation circuit 219.

(Function/Effect)

The color misregistration evaluation can be reliably performed as compared with other evaluation methods.

14. An image processing apparatus according to 3, wherein the 1-chip imaging element has a mosaic filter of a primary color Bayer array, a color component R or B is obtained in the pixel of interest, four directions, upper, lower, right, and left directions of the pixel of interest are defined as said plurality of directions S1 to S4, said plurality of types of color components are G and a color component obtained in the pixel of interest, and the omitted color component is G.

(Corresponding Embodiments)

The corresponding embodiments are the same as "Corresponding Embodiments" described in 3.

(Function/Effect)

This is the same as 3. except that this is particularly suitable for a primary color Bayer array.

15. An image processing apparatus according to 3, wherein the 1-chip imaging element has a mosaic filter of a primary color Bayer array, a color component G is obtained in the pixel of interest, said plurality of directions are defined as directions connecting pixels having a color component R in the predetermined neighborhood centered on the pixel of interest, said plurality of types of color components are R and G, and the omitted color component is R.

(Corresponding Embodiments)

The corresponding embodiments are the same as "Corresponding Embodiments" described in 3.

(Function/Effect)

This is the same as 3. except that this is particularly suitable for a primary color Bayer array.

16. An image processing apparatus according to 3, wherein the 1-chip imaging element has a mosaic filter of a primary color Bayer array, a color component G is obtained in the pixel of interest, said plurality of directions are defined as directions connecting pixels having a color component B in the predetermined neighborhood centered on the pixel of interest, said plurality of types of color components are B and G, and the omitted color component is B.

(Corresponding Embodiments)

The corresponding embodiments are the same as "Corresponding Embodiments" described in 3.

(Function/Effect)

This is the same as 3. except that this is particularly suitable for a primary color Bayer array.

17. An image processing apparatus according to 1, wherein said plurality of directions are set as directions connecting the pixel of interest and pixels each having both the omitted color component at the pixel of interest and one of the color components obtained at the pixel of interest.

(Corresponding Embodiments)

The corresponding embodiments are the same as "Corresponding Embodiments" described in 2.

(Function/Effect)

When a direction for calculating weights is set in a direction connecting the pixel of interest and a pixel in which the same color component as in the pixel of interest is obtained, the weight calculation can be more appropriately performed.

18. An image processing apparatus according to 17, wherein the 1-chip imaging element has a mosaic filter of a primary color Bayer array, the omitted color component in the pixel of interest is R or B, and one of the color components obtained in the pixel of interest is G.

(Corresponding Embodiments)

The corresponding embodiments are the same as "Corresponding Embodiments" described in 3.

(Function/Effect)

This is the same as 17. except that this is particularly suitable for a primary color Bayer array.

19. An image processing apparatus according to 9, wherein when the predetermined coefficient is to be changed in accordance with the evaluation result of the color misregistration evaluation unit, the color misregistration evaluation unit identifies the color components whose misregistration amount are large, and the weight setting unit makes the coefficient assigned to the pixel value difference associated with the color components smaller.

(Corresponding Embodiment)

The corresponding embodiment is the same as "Corresponding Embodiment" described in 9.

(Function/Effect)

When the color misregistration is large, the information of a color component contained in neighboring pixels and not obtained at the pixel of interest is less contributed to the final result, thereby preventing a side-effect.

20. An image processing apparatus according to 12, wherein when the predetermined coefficient is to be changed in accordance with the evaluation result of the color misregistration evaluation unit, the color misregistration evaluation unit identifies the color components whose misregistration amount are large, and the restoration unit makes the coefficient assigned to the weighted average result associated with the color components smaller.

(Corresponding Embodiment)

The corresponding embodiment is the same as "Corresponding Embodiment" described in 12.

(Function/Effect)

When the color misregistration is large, the use ratio s of the information of a color component which is contained in neighboring pixels but is not subjected to omission restoration at the pixel of interest is reduced, thereby preventing a side-effect.

21. An image processing program which causes a computer to input an image obtained by sensing an optical image by an image sensing system, compensate an omitted color component, and output a color image, comprising:
 a weight setting function which sets a weight Wk in each direction Sk (k is an integer from 1 to n) of a plurality of directions S1, S2, . . . , Sn (n is an integer of not less than 1) starting from a pixel of interest in a predetermined neighborhood of the pixel of interest;
 an averaging function which calculates a weighted average of pixel values Vk of pixels having a specific color component and located on each direction Sk (k is an integer from 1 to n) in the predetermined neighborhood by using weights W1 to Wn of the pixel values V1 to Vn; and
 a restoration unit function which causes the averaging function to calculate weighted averages of a plurality of types of color components and restores a value of an omitted color component of the pixel of interest on the basis of the weighted average result and the pixel value of the pixel of interest.

(Corresponding Embodiments)

The corresponding embodiments are the same as "Corresponding Embodiments" described in 1.

(Function/Effect)

The function/effect is the same as "Function/Effect" described in 1.

22. An image processing program according to 21, wherein the function setting function selects, for each color component, at least one set having two pixels parallel to a direction Sk in the predetermined neighborhood and having the color component, and a weight Wk in said each direction Sk is calculated on the basis of a value adjusted by multiplying a predetermined coefficient to a pixel value difference of said each set.

(Corresponding Embodiments)

The corresponding embodiments are the same as "Corresponding Embodiments" described in 1.

(Function/Effect)

The weight setting function calculates a pixel value difference between two pixels which have corresponding color components and parallel to a direction along which a weight is to be calculated. The weight setting function calculates a weight on the basis of the pixel value difference. Omitted color components can be optimally restored for a variety of edge patterns.

23. An image processing program according to 21, wherein the restoration function has a color misregistration evaluation function of evaluating an edge color misregistration amount between color components in the pixel of interest, and a calculation method for the omitted color component is changed in accordance with an evaluation result of the color misregistration evaluation function.

(Corresponding Embodiment)

The corresponding embodiment is the same as "Corresponding Embodiment" described in 11.

(Function/Effect)

The function/effect is the same as "Function/Effect" described in 11.

24. An image processing program according to 21, wherein the restoration function has a color misregistration evaluation function of evaluating an edge color misregistration amount between color components in the pixel of interest, a coefficient which changes in accordance with the evaluation result of said color misregistration evaluation function is multiplied to the pixel value of the pixel of interest and the weighted average result of the averaging function for said plurality of color components, and the value of the omitted color component is obtained.

(Corresponding Embodiments)

The corresponding embodiments are the same as "Corresponding Embodiments" described in 1 and 11. The coefficients are $\beta r$ and $\beta b$.

A weight is calculated by mixing pixel value differences for a plurality of types of color components. For this reason, omitted color components can be optimally restored for an edge pattern which cannot be coped with by using a pixel value difference for a single color component.

The degradation in an omitted color component restoration result at an edge portion in the presence of color misregistration is prevented so that the result becomes better than that in simple interpolation result.

25. An image processing program according to any one of 2, 3, and 24, wherein the color misregistration evaluation function evaluates an edge color misregistration amount between the color components on the basis of chromatic aberration of the optical image.

(Corresponding Embodiment)

The color misregistration evaluation function corresponds to at least the function of implementing the aberration calculation circuit 219 and is particularly represented by the flow in FIG. 14.

(Function/Effect)

The color misregistration evaluation can be reliably performed as compared with other evaluation methods.

According to the present invention, optimal interpolation can be performed even for edges which is neither horizontal nor vertical. An omitted color component can accordingly be restored with higher precision.

What is claimed is:

1. An image processing apparatus which inputs an image obtained by sensing an optical image by an imaging system, compensates for an omitted color component, and outputs a color image, the apparatus comprising:

a weight setting unit which sets a weight Wk in each direction Sk (k is an integer from 1 to n) of a plurality of directions S1, S2, ..., Sn (n is an integer of not less than 1) starting from a pixel of interest in a predetermined neighborhood of the pixel of interest;

an average value calculation unit which calculates a weighted average of pixel values Vk of pixels having a specific color component and located on each direction Sk (k is an integer from 1 to n) in the predetermined neighborhood by using the weights W1 to Wn of the pixel values V1 to Vn; and a restoration unit which causes the average calculation unit to calculate weighted averages of a plurality of types of color components, and which restores a value of the omitted color component of the pixel of interest on the basis of a weighted average result and a pixel value of the pixel of interest.

2. An image processing apparatus according to claim 1, wherein the weight setting unit selects for a predetermined color component at least one set having two pixels parallel to said each direction Sk in the predetermined neighborhood and having the predetermined color component and calculates the weight Wk for said each direction Sk on the basis of a pixel value difference of each set.

3. An image processing apparatus according to claim 2, wherein the weight setting unit calculates the pixel value differences of said each set for a plurality of types of color components and determines the weight Wk for said each direction Sk on the basis of a sum of products of the pixel value differences and a predetermined coefficient.

4. An image processing apparatus according to claim 3, wherein the imaging system comprises a 1-chip imaging element which has a mosaic filter of a primary color Bayer array, a color component R or B is obtained in the pixel of interest, four directions, upper, lower, right, and left directions of the pixel of interest, are defined as said plurality of directions S1 to S4, said plurality of types of color components are G and a color component obtained in the pixel of interest, and the omitted color component is G.

5. An image processing apparatus according to claim 3, wherein the imaging system comprises a 1-chip imaging element which has a mosaic filter of a primary color Bayer array, a color component G is obtained in the pixel of interest, said plurality of directions are defined as directions connecting pixels having a color component R in the predetermined neighborhood centered on the pixel of interest, said plurality of types of color components are R and G, and the omitted color component is R.

6. An image processing apparatus according to claim 3, wherein the imaging system comprises a 1-chip imaging element which has a mosaic filter of a primary color Bayer array, a color component G is obtained in the pixel of interest, said plurality of directions are defined as directions connecting pixels having a color component B in the predetermined neighborhood centered on the pixel of interest, said plurality of types of color components are B and G, and the omitted color component is B.

7. An image processing apparatus according to claim 1, wherein the weight setting unit comprises an estimation unit which estimates an approximate value of a predetermined color component of the pixel of interest in the predetermined neighborhood, and calculates the weight Wk for said each direction Sk on the basis of the pixel value of the pixel located on said each direction Sk and having the predetermined color component and a difference between the approximate values.

8. An image processing apparatus according to claim 1, wherein the weight setting unit selects a plurality of sets each having the two pixels parallel to said each direction Sk in the predetermined neighborhood and having the predetermined color component and calculates a minimum value of the pixel value differences of each set.

9. An image processing apparatus according to any one of claims 2, 3, and 8, wherein the weight setting unit obtains a maximum value of the pixel value differences after the pixel value difference for said each direction Sk is calculated for all integers of 1 to n and calculates weights so as to equalize weights in the respective directions when the magnitudes of the maximum values are smaller.

10. An image processing apparatus according to any one of claims 3 to 8, wherein the weight setting unit calculates the weight Wk for said each direction so that each weight is in inverse proportion to the pixel value difference for said each direction Sk and the sum of the weights becomes 1.

11. An image processing apparatus according to any one of claims 2, 3, and 8, wherein the weight setting unit has an evaluation unit which evaluates an edge color misregistration amount between color components in the pixel of interest and changes a weight calculation method in accordance with an evaluation result of the color misregistration evaluation unit.

12. An image processing apparatus according to claim 11, wherein the weight setting unit changes the weight calculation method by changing the predetermined coefficient in accordance with an evaluation result in the color misregistration evaluation unit.

13. An image processing apparatus according to claim 12, wherein when the predetermined coefficient is to be changed in accordance with the evaluation result of the color misregistration evaluation unit, the color misregistration evaluation unit identifies the color components whose misregistration amount are large, and the weight setting unit makes the coefficient assigned to the pixel value difference associated with the color components smaller.

14. An image processing apparatus according to claim 1, wherein the restoration unit multiplies predetermined coefficients by the weighted average results for the plurality of color components and the values of the pixel of interest, and adds the products to obtain a value of the omitted color component.

15. An image processing apparatus according to claim 14, wherein the restoration unit comprises a color misregistration evaluation unit which evaluates a color misregistration amount of an edge between color components in the pixel of interest and changes a calculation for the omitted color component in accordance with an evaluation result in the color misregistration evaluation unit.

16. An image processing apparatus according to claim 14, wherein the restoration unit comprises a color misregistration evaluation unit which evaluates a color misregistration amount of an edge between color components in the pixel of interest and changes the predetermined coefficient in accordance with the evaluation result of the color misregistration evaluation unit.

17. An image processing apparatus according to any one of claims 15 and 16, wherein the color misregistration evaluation unit evaluates an edge color misregistration amount between color components on the basis of chromatic aberration of the optical image.

18. An image processing apparatus according to claim 16, wherein when the predetermined coefficient is to be changed in accordance with the evaluation result of the color misregistration evaluation unit, the color misregistration evaluation unit identifies the color components whose misregistration amount are large, and the restoration unit makes the coefficient assigned to the weighted average result associated with the color components smaller.

19. An image processing apparatus according to claim 1, wherein said plurality of directions are set as directions connecting the pixel of interest and pixels each having both the omitted color component at the pixel of interest and another color component obtained at the pixel of interest.

20. An image processing apparatus according to claim 19, wherein the imaging system comprises a 1-chip imaging element which has a mosaic filter of a primary color Bayer array, the omitted color component in the pixel of interest is R or B, and said another color component obtained in the pixel of interest is G.

21. A computer readable medium storing a computer program which causes a computer to input an image obtained by sensing an optical image by an image sensing system, compensate for an omitted color component, and output a color image, the program being executable by the computer to cause the computer to perform functions comprising:
a weight setting function which sets a weight Wk in each direction Sk (k is an integer from 1 to n) of a plurality of directions S1, S2, . . . , Sn (n is an integer of not less than 1) starting from a pixel of interest in a predetermined neighborhood of the pixel of interest;
an averaging function which calculates a weighted average of pixel values Vk of pixels having a specific color component and located on each direction Sk (k is an integer from 1 to n) in the predetermined neighborhood by using the weights W1 to Wn of the pixel values V1 to Vn; and
a restoration unit function which causes the averaging function to calculate weighted averages of a plurality of types of color components, and which restores a value of the omitted color component of the pixel of interest on the basis of a weighted average result and a pixel value of the pixel of interest.

22. A computer readable medium according to claim 21, wherein the weight setting function selects, for each color component, at least one set having two pixels parallel to a direction Sk in the predetermined neighborhood and having the color component, and a weight Wk in said each direction Sk is calculated on the basis of a value adjusted by multiplying a predetermined coefficient to a pixel value difference of said each set.

23. A computer readable medium according to claim 21, wherein the restoration function includes a color misregistration evaluation function of evaluating an edge color misregistration amount between color components in the pixel of interest, and a calculation method for the omitted color component is changed in accordance with an evaluation result of the color misregistration evaluation function.

24. A computer readable medium according to claim 21, wherein the restoration function includes a color misregistration evaluation function of evaluating an edge color misregistration amount between color components in the pixel of interest, a coefficient which changes in accordance with the evaluation result of said color misregistration evaluation function is multiplied to the pixel value of the pixel of interest and the weighted average result of the averaging function for said plurality of color components, and the value of the omitted color component is obtained.

25. A computer readable medium according to any one of claims 23 and 24, wherein the color misregistration evaluation function evaluates an edge color misregistration amount between the color components on the basis of chromatic aberration of the optical image.

* * * * *